United States Patent
Gansley et al.

(10) Patent No.: US 9,724,638 B2
(45) Date of Patent: Aug. 8, 2017

(54) APPARATUS AND METHOD FOR EVAPORATING WASTE WATER AND REDUCING ACID GAS EMISSIONS

(71) Applicant: ALSTOM Technology Ltd, Baden (CH)

(72) Inventors: Raymond Raulfs Gansley, Knoxville, TN (US); Jurgen Dopatka, Knoxville, TN (US); Sanjay Kumar Dube, Knoxville, TN (US); Philip C. Rader, Knoxville, TN (US)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/142,205

(22) Filed: Apr. 29, 2016

(65) Prior Publication Data

US 2016/0243494 A1 Aug. 25, 2016

Related U.S. Application Data

(63) Continuation-in-part of application No. 14/146,424, filed on Jan. 2, 2014, now Pat. No. 9,352,274.

(51) Int. Cl.
*B01D 53/00* (2006.01)
*B01D 53/34* (2006.01)
(Continued)

(52) U.S. Cl.
CPC ........ *B01D 53/1456* (2013.01); *B01D 1/0011* (2013.01); *B01D 1/14* (2013.01);
(Continued)

(58) Field of Classification Search
CPC ...... B01D 1/18; B01D 1/20; B01D 2257/302; B01D 53/00; B01D 53/34; B01D 53/38;
(Continued)

(56) References Cited

U.S. PATENT DOCUMENTS 3,926,129 A 12/1975 Wall
4,322,393 A 3/1982 Gleason et al.
(Continued)

FOREIGN PATENT DOCUMENTS

CN 1478585 A 3/2004
CN 201410699622 A * 11/2014 ................ C02F 9/10
(Continued)

OTHER PUBLICATIONS

U.S. Appl. No. 15/141,986, filed Apr. 29, 2016, Gansley et al.
U.S. Non-Final Office Action issued in connection with Related U.S. Appl. No. 15/141,986 dated May 17, 2017.

*Primary Examiner* — Timothy Vanoy
(74) *Attorney, Agent, or Firm* — GE Global Patent Operation; Rita D. Vacca (57) ABSTRACT

An apparatus for evaporating waste water and reducing flue gas acid gas emissions includes an evaporator device configured to receive a portion of flue gas emitted from a combustion unit and waste water for direct contact of the flue gas with the waste water to cool and humidify the flue gas, and to evaporate the waste water. An alkaline reagent as well as activated carbon may be mixed with the waste water prior to waste water contact with the flue gas. Solid particulates that are dried and entrained within the cooled and humidified flue gas can be separated from the flue gas via a particulate collector.

15 Claims, 4 Drawing Sheets

(51) Int. Cl.

| | |
|---|---|
| *B01D 53/38* | (2006.01) |
| *B01D 53/50* | (2006.01) |
| *B01D 53/74* | (2006.01) |
| *B01D 53/80* | (2006.01) |
| *B01D 53/14* | (2006.01) |
| *C02F 1/04* | (2006.01) |
| *B01D 1/20* | (2006.01) |
| *B01D 1/00* | (2006.01) |
| *F23J 15/00* | (2006.01) |
| *F23J 15/04* | (2006.01) |
| *B01D 1/14* | (2006.01) |
| *B01D 1/16* | (2006.01) |
| *C02F 1/12* | (2006.01) |
| *C02F 1/28* | (2006.01) |
| *C02F 1/06* | (2006.01) |
| *C02F 1/66* | (2006.01) |
| *C02F 103/18* | (2006.01) |
| *B01D 53/30* | (2006.01) |
| *B01D 53/86* | (2006.01) |

(52) U.S. Cl.
CPC ............... *B01D 1/16* (2013.01); *B01D 1/20* (2013.01); *B01D 53/504* (2013.01); *C02F 1/048* (2013.01); *F23J 15/003* (2013.01); *F23J 15/04* (2013.01); *B01D 53/30* (2013.01); *B01D 53/8625* (2013.01); *B01D 2253/102* (2013.01); *B01D 2257/2045* (2013.01); *B01D 2257/2047* (2013.01); *B01D 2257/302* (2013.01); *B01D 2257/402* (2013.01); *B01D 2257/404* (2013.01); *B01D 2257/60* (2013.01); *B01D 2257/602* (2013.01); *B01D 2258/0283* (2013.01); *C02F 1/06* (2013.01); *C02F 1/12* (2013.01); *C02F 1/283* (2013.01); *C02F 1/66* (2013.01); *C02F 2103/18* (2013.01); *C02F 2209/02* (2013.01); *C02F 2209/38* (2013.01); *C02F 2305/12* (2013.01); *F23J 2215/20* (2013.01); *F23J 2217/102* (2013.01); *F23J 2219/40* (2013.01)

(58) Field of Classification Search
CPC .... B01D 53/502; B01D 53/505; B01D 53/74; B01D 53/80; B01D 2258/0283
See application file for complete search history.

(56) References Cited

U.S. PATENT DOCUMENTS

| | | | |
|---|---|---|---|
| 4,620,856 A | 11/1986 | Rosenberg et al. | |
| 5,814,288 A | 9/1998 | Madden et al. | |
| 5,928,412 A | 7/1999 | Bastholm et al. | |
| 6,076,369 A | 6/2000 | Ochi et al. | |
| 7,524,470 B2 | 4/2009 | Barger et al. | |
| 7,625,537 B2 | 12/2009 | Rader et al. | |
| 7,766,997 B2 | 8/2010 | Lindau | |
| 8,052,763 B2 | 11/2011 | Gallot | |
| 8,268,276 B2 | 9/2012 | Pearson | |
| 8,388,917 B2 | 3/2013 | Ukai et al. | |
| 8,475,750 B2 | 7/2013 | Ukai et al. | |
| 8,475,850 B2 | 7/2013 | Tripp et al. | |
| 8,585,869 B1 | 11/2013 | Duesel, Jr. et al. | |
| 8,628,603 B2 | 1/2014 | Martin et al. | |
| 8,715,402 B2 | 5/2014 | Ukai et al. | |
| 8,877,066 B2 | 11/2014 | Cenci et al. | |
| 8,883,107 B2 | 11/2014 | Ukai et al. | |
| 8,961,916 B1 | 2/2015 | Bader | |
| 8,986,428 B2 | 3/2015 | Ukai et al. | |
| 9,352,274 B2 * | 5/2016 | Rader | |
| 2001/0008620 A1 | 7/2001 | Dohmann et al. | |
| 2009/0294377 A1 | 12/2009 | Gallot | |
| 2011/0262331 A1 | 10/2011 | Ukai et al. | |
| 2012/0240761 A1* | 9/2012 | Ukai | B01D 1/14 95/16 |
| 2012/0285353 A1 | 11/2012 | Kumar | |
| 2013/0220792 A1 | 8/2013 | Ungerer et al. | |
| 2013/0248121 A1 | 9/2013 | Ukai et al. | |
| 2014/0045131 A1* | 2/2014 | Fukuda | C02F 1/048 432/72 |
| 2014/0202362 A1* | 7/2014 | Ukai | B01D 1/14 110/215 |
| 2016/0185619 A1 | 6/2016 | Ukai et al. | |
| 2016/0243498 A1 | 8/2016 | Kamiyama et al. | |

FOREIGN PATENT DOCUMENTS

| | | | | |
|---|---|---|---|---|
| CN | 204298090 U | * | 4/2015 | ............... C02F 1/16 |
| CN | 104671221 A | * | 6/2015 | ............ C01B 17/74 |
| DE | 4124844 A1 | | 1/1993 | |
| DE | 4339072 A1 | | 5/1995 | |
| DE | 4404284 A1 | | 8/1995 | |
| EP | 1 955 755 A2 | | 8/2008 | |
| JP | S59132921 A | | 7/1984 | |
| JP | S61-181519 A | | 8/1986 | |
| JP | 102817/87 | | 5/1987 | |
| JP | S63200818 | | 8/1988 | |
| JP | 63-063248 B | | 12/1988 | |
| JP | 198613/90 | | 8/1990 | |
| JP | H07-110109 A | | 4/1995 | |
| JP | 294912/97 | | 11/1997 | |
| JP | 2012-057037 A | | 3/2012 | |
| JP | 2012-057389 A | | 3/2012 | |
| JP | 2012-515638 A | | 7/2012 | |
| JP | 2012-196638 A | | 10/2012 | |
| JP | 2012200721 A | | 10/2012 | |
| WO | 2006/030398 A1 | | 3/2006 | |

* cited by examiner

APPARATUS AND METHOD FOR EVAPORATING WASTE WATER AND REDUCING ACID GAS EMISSIONS

CROSS-REFERENCE TO RELATED APPLICATIONS

This is a continuation-in-part application claiming priority to pending application Ser. No. 14/146,424 having a filing date of Jan. 2, 2014, entitled "APPARATUS AND METHOD FOR EVAPORATING WASTE WATER AND REDUCING ACID GAS EMISSIONS", incorporated herein in its entirety by reference.

TECHNICAL FIELD

The present disclosure relates to an apparatus and method for using flue gas from a boiler or other combustion unit to evaporate waste water and reducing gas emissions.

BACKGROUND

Utility and industrial plants such as power plants, electricity generation plants, waste-to-energy facilities, cement kilns, and other facilities firing fossil fuels can be subject to strict limits with respect to air emissions and waste water discharge to help ensure clean and environmentally sound power generation. Traditionally, compliance with air emissions limits is achieved through the use of a wet or dry flue gas desulfurization system. Water treatment systems can be utilized to treat waste water discharge to comply with applicable waste water regulations. Examples of flue gas cleaning systems and/or waste water treatment systems can be appreciated from International Publication No. WO 2006030398, U.S. Patent Application Publication Nos. 2009/0294377, 2011/0262331, 2012/0240761, 2013/0248121, and 2013/0220792, U.S. Pat. Nos. 6,076,369, 7,524,470, 7,625,537, 8,388,917, and 8,475,750, European Patent Publication No. EP 1 955 755, and Japanese Published Patent Application No. JP 2012200721.

The capital costs of air emissions systems utilizing a wet or dry flue gas desulfurization system and the associated balance of plant systems (e.g. ducts, fans, bulk material handling systems, etc.) can often be relatively expensive (e.g. between $200-500 per kilowatt (kW)). In retrofit situations, the capital costs associated with such systems may render a plant uneconomical. In addition to the capital costs, the wet and dry flue gas desulfurization systems also involve substantial operating costs associated with reagent consumption, auxiliary power usage, and operations and management staffing.

Waste water treatment systems can be configured to neutralize and precipitate heavy metals, perform biological treatment of the waste water, and also filter the waste water to clean the water for outputting the water. Costs associated with operation of waste water treatment systems can be relatively significant in terms of capital costs and operating costs.

SUMMARY

According to aspects illustrated herein, there is provided a method for evaporating waste water and reducing acid gas emissions comprising at least the steps of contacting flue gas with waste water to cool and humidify the flue gas and dry solid particulates within the waste water, and separating the solid particulates from the cooled and humidified flue gas.

According to other aspects illustrated herein, an apparatus for evaporating waste water and reducing acid gas emissions comprises an evaporator device configured for receiving at least a first portion of flue gas emitted from a boiler unit, an alkaline reagent, solid particulates, and waste water to directly contact the flue gas with the waste water to cool and humidify the flue gas and to dry the solid particulates.

According to other aspects illustrated herein a plant, comprises a combustion unit configured to combust fuel to emit at least one of steam and flue gas, a source of an alkaline reagent, a source of liquid waste water, a particulate collector configured to separate solid material from the flue gas, and a mixer device connected to the source of liquid waste water, the source of the alkaline reagent, and the particulate collector to receive the liquid waste water, the alkaline reagent, and at least a portion of the solid material separated by the particulate collector. The mixer device can be configured to mix the liquid waste water, the alkaline reagent, and the portion of the solid material to form a mixture. The plant can also include a conduit or vessel connected to the combustion unit and the mixer device to receive the mixture from the mixer device and at least a first portion of the flue gas from the combustion unit. The conduit or vessel can be configured for directly contacting the mixture with the flue gas for a pre-specified time period to cool and humidify the flue gas and to dry solid particulates within the mixture prior to the flue gas and the solid material being fed to the particulate collector.

Further, disclosed is a method for evaporating waste water and reducing acid gas emissions in a combustion flue gas that comprises supplying waste water to a heat exchanger for heating of the waste water to produce heated waste water, evaporating the heated waste water in a flash vessel collecting remaining waste water in the flash vessel, supplying the remaining waste water to an evaporator device arranged with a flow of the flue gas through the evaporator device for evaporation of the remaining waste water in the evaporator device, and supplying the flue gas to a wet flue gas desulfurization system for absorption of acid gas from the flue gas to produce treated flue gas for release to the environment. The method also comprises adding at least one from a group consisting of activated carbon, activated coke, alkaline reagent, and anti-scaling agent to the waste water prior to heating and evaporation of the waste water. Also, the method comprises supplying an absorbent liquid to the wet flue gas desulfurization system for absorption of acid gas from the flue gas upon contact with the flue gas. According to the method, heating of the waste water in the heat exchanger is at a temperature of about 175° F. to about 350° F., or about 80° C. to about 180° C., and at a pressure of about 1 bar (absolute) to about 10 bar (absolute), or about 1.4 bar (absolute) to about 6 bar (absolute). According to the method, the evaporator device may be a spray dryer. Also according to the method the evaporator device may be a system with moist absorbent material dispersal. Still further, disclosed is a system for evaporating waste water and reducing acid gas emissions from a combustion flue gas that comprises a wet flue gas desulfurization system for absorption of acid gas from the flue gas thereby producing waste water and producing treated flue gas for release to the environment, a heat exchanger supplied waste water for heating of the supplied waste water to produce heated waste water, a flash vessel for evaporation of the heated waste water and for collection of remaining waste water in the flash vessel, and an evaporation device upstream of the wet flue gas desulfurization system for evaporation of the remaining waste water in a flow of the flue gas flowing through the evaporator device. Also, the system comprises a combustion unit producing flue gas fluidly connected to the evaporator device such that at least a first portion of the flue gas is supplied to the evaporator device. According to the system, the evaporator device may be a spray dryer. Also, the evaporator device may be a system with moist absorbent material dispersal. Further, the system comprises a control device operable for adjustment of system operating conditions. The control device may be operable to receive measurements from one or more system sensors for intermittent or continuous measurement of at least one system operating condition of temperature, flow rate and humidity. The system heat exchanger is operable at a temperature of about 175° F. to about 350° F., or about 80° C. to about 180° C. and a pressure of about 1 bar (absolute) to about 10 bar (absolute), or about 1.4 bar (absolute) to about 6 bar (absolute) for heating of waste water. The above described and other features are exemplified by the following figures and detailed description.

BRIEF DESCRIPTION OF THE DRAWINGS

Referring now to the figures, which are exemplifying embodiments, and wherein the like elements are numbered alike.

Other details, objects, and advantages of embodiments of the innovations disclosed herein will become apparent from the following description of exemplifying embodiments and associated exemplifying methods.

DETAILED DESCRIPTION

Disclosed herein is a power or industrial plant, an apparatus for evaporating waste water to reduce acid gas emissions, and a method of practicing the same that can be configured to reduce emissions such as air pollution and also reduce waste water discharge. Embodiments of the apparatus for evaporating waste water to reduce acid gas emissions can be utilizable in power plants, utility plants, and industrial plants.

Figure 1:
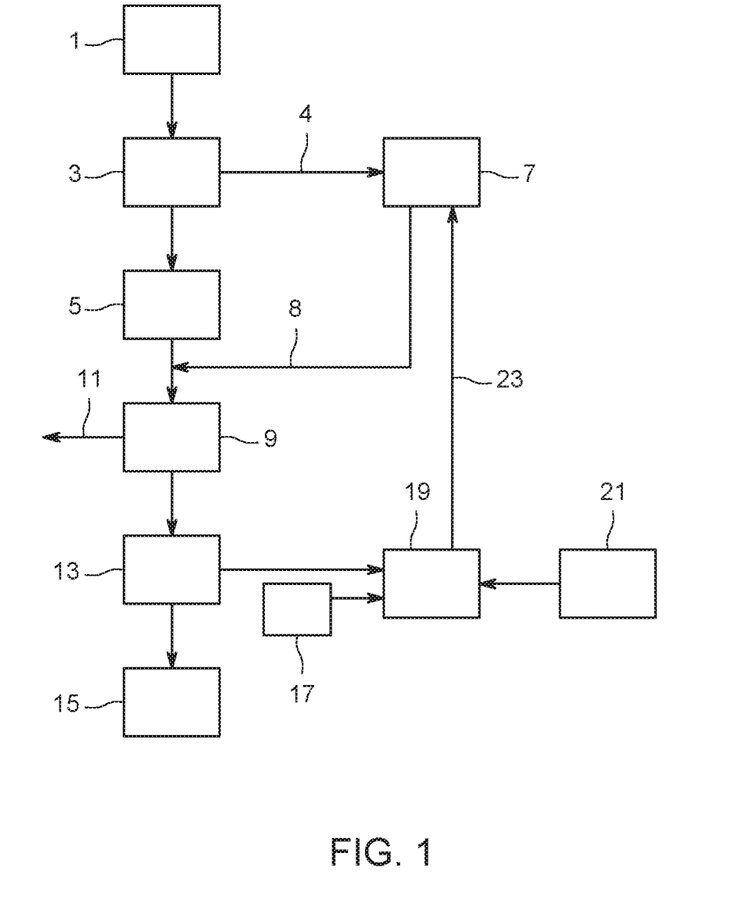
FIG. 1 is a block diagram of a first exemplified embodiment of an apparatus for evaporating waste water and reducing acid gas emissions.

Referring to FIG. 1, a power plant or an industrial plant can include a combustion unit that combusts a fuel to emit steam and/or a flue gas, such as a gas turbine or a boiler unit 1. The boiler unit 1 can be fed at least one oxygen containing gas flow (e.g. an oxidant flow such as air, $O_2$ gas, or another type of gas containing $O_2$ gas) and a fuel to combust the fuel. The fuel can be a fossil fuel such as coal, oil, or natural gas. In addition to steam, flue gas can be formed via combustion of the fuel and emitted by the boiler unit 1. The steam can be transported to a turbine (not shown) for use in generating electricity or put to other uses (e.g. district heating, process heating, etc.). The flue gas can be transported to other elements for use of the heat of the flue gas prior to emitting at least a portion of the flue gas to the atmosphere.

One or more conduits can connect the boiler unit 1 to a nitrogen oxide removing unit 3 so that the flue gas can be passed from the boiler unit 1 to the nitrogen oxide removing unit 3. The nitrogen oxide removing unit 3 can be configured as a selective catalytic reduction (SCR) unit, a selective non-catalytic reduction (SNCR) unit, or another type of element configured to remove nitrogen oxides (e.g. $NO_2$, $NO_3$, $NO_x$) from the flue gas.

After being passed through the nitrogen oxide removing unit 3, the flue gas can be split into multiple streams for further processing or use. For instance, a first portion of the flue gas can be passed through a bypass conduit 4 for bypassing a pre-heater 5 and feeding the flue gas to an evaporator device 7. The first portion of the flue gas can be considered a "slipstream" in some embodiments of the apparatus. A second portion of the flue gas can be passed through the pre-heater 5 via at least one conduit connecting the nitrogen oxide removing unit 3 to the pre-heater 5 to heat fluid flows prior to that fluid being fed to the boiler unit 1 for combusting the fuel. The second portion of the flue gas can pass through the pre-heater 5 prior to being fed to a particulate collector 9.

The evaporator device 7 can be a vessel sized to receive the flue gas and liquid waste water from a waste water vessel 19. At least one waste water conduit 23 can connect the evaporator device 7 to the waste water vessel 19 for receiving the liquid waste water. The waste water vessel 19 can be a waste water holding tank or other vessel that is configured to receive liquid waste water from one or more elements of a plant and retain that waste water for supplying the waste water to the evaporator device 7 at a pre-specified flow rate or controlled flow rate.

The evaporator device 7 can be configured as a spray dryer absorber (SDA) or other device or vessel capable of directly contacting a waste water stream with flue gas in such a way as to cool the flue gas to a reduced temperature and increase the humidity level of the flue gas by evaporating the waste water. The evaporator device 7 can include a rotary atomizer, a dual fluid nozzle, or other dispersion element to spray or otherwise disperse the liquid waste water into the flue gas for cooling and humidifying the flue gas and evaporating the waste water.

The diversion of a portion of flue gas emitted by the boiler unit 1 prior to that flue gas being fed to a pre-heater 5 for feeding to the evaporator device 7 can permit relatively hot flue gases (e.g. flue gas having a temperature of 700° F., 370° C., between 600° F. and 800° F., or between 300° C. and 450° C.) to be fed to the evaporator device. The above temperature range is representative of a steam producing power plant application, and other industrial or gas fired applications may have different temperature ranges. The use of such hot flue gas can permit the flue gas transported to the evaporator device 7 to evaporate a larger amount of waste water as compared to cooler flue gas that has previously been used in other heat transfer operations (e.g. after the flue gas has passed through a pre-heater 5). The higher flue gas temperature available by diverting the flue gas prior to entering the pre-heater 5 can permit the evaporator device 7 to be fabricated at a lower cost as the size of the evaporator device 7 may not need to accommodate larger volumes of flue gas to evaporate a desired amount of waste water as compared to other embodiments that may be configured to utilize cooler flue gas. In addition to cost savings, the use of a smaller evaporator device 7 can permit the evaporator device 7, bypass conduit 4, and output conduit 8 to utilize a smaller footprint that can be advantageous for retrofitting embodiments of the apparatus within power plants or industrial plants that may have relatively low space availability.

Use of the hot flue gas taken from upstream of the pre-heater 5 has an additional advantage in that the flue gas pressure at this location is higher than the flue gas pressure after the pre-heater. The higher pressure can facilitate a natural circulation of the flue gas passed through the bypass conduit 4 for feeding to the evaporator device 7 and outputting to the output conduit 8 so that a pump or fan is not needed for driving the flow of the flue gas to or from the evaporator device. Of course, a pump or fan may still be utilized as a back-up measure or to ensure control of flue gas flow rate is maintainable within a desired flow rate range. When a pump or fan is used in such embodiments, the pump or fan may be able to operate at lower power levels due to the larger pressure drop provided by use of the hotter flue gas.

The flow rate of flue gas entering the evaporator device 7, the temperature of the flue gas, and/or the humidity of the flue gas exiting the evaporator device 7 can be monitored via at least one flow sensor adjacent to the inlet of the evaporator device 7, at least one temperature sensor, and/or at least one humidity sensor positioned adjacent the outlet of the evaporator device 7 or positioned within the output conduit 8 of the evaporator device 7 to control operations of the evaporator device to ensure that the flue gas is cooled to at least a pre-specified temperature and has a pre-specified level of humidity. The flow rate of flue gas passing into the bypass conduit 4 and/or waste water fed to the evaporator device 7 can be adjusted based upon the flow rate, temperature, and humidity level of the flue gas detected by the one or more sensors. Alternatively, the flue gas flow rate can be maintained while the waste water flow is controlled to achieve the desired temperature and humidity conditions of the flue gas.

For example, the flue gas can be monitored to maintain the flue gas within the output conduit 8 at a pre-specified temperature range such as at a temperature of between 180° F. and 300° F. or at a temperature of between 80° C. and 150° C. As another example, the temperature of the flue gas within the evaporator device 7 and/or within the output conduit 8 can be monitored to ensure that the flue gas is at least 10° C. or 30° F. above its adiabatic saturation temperature to avoid wetting of the solid particulates and/or corrosion. In the event the flue gas is determined to be below a pre-specified temperature threshold, a larger amount of flue gas may be diverted into the bypass conduit 4 for feeding to the evaporator device 7 and/or the amount of waste water being fed to the evaporator device may be decreased so that less waste water is contacted with the flue gas. In the event the flue gas is determined to be above a pre-specified temperature threshold, more waste water may be fed to the evaporator device 7 and/or less flue gas may be transported through the bypass conduit 4 to the evaporator device.

The liquid waste water fed to the evaporator device 7 can include solid material such as solid particulates that are suspended within the waste water. The waste water can also include elements within the water that can precipitate out of the water as the liquid waste water is heated and subsequently evaporated in the evaporator device 7. When solids are present within the waste water, the solids can improve drying operations.

In an exemplary embodiment that can be preferred for at least some applications, solid material is added to the waste water to facilitate evaporation of the waste water and drying of dissolved and suspended solids thus avoiding deposition of moist particles in downstream conduits and vessels. For instance, solid particulates from the particulate collector 9 or a solid byproduct from a flue gas desulfurization system can be fed to the waste water or mixed with the waste water to add solid particulates to the waste water. The mixing of the solid particulates within the waste water may occur in a waste water vessel 19, such as a holding tank, prior to the waste water being fed to the evaporator device.

The liquid waste water can also include other elements that are mixed or added therein. For example, a material containing an alkaline reagent such as lime, hydrated lime, sodium carbonate, trona, or alkaline fly ash can be added to the waste water. An alkaline reagent source 17 such as a container retaining such material can be connected to a waste water vessel 19 by one or more pipes or other feed conduits for feeding the alkaline reagent to the waste water while it is retained in the waste water vessel 19. In alternative embodiments, the alkaline reagent can be fed separately from the flue gas in a conduit prior to the flue gas entering the evaporator device 7, or into the evaporator device 7, or after the flue gas has exited an evaporator device (e.g. the alkaline reagent can be fed to the flue gas separate from the waste water and into bypass conduit 4 or output conduit 8 or evaporator device 7).

A pre-specified amount of alkaline reagent can be fed to the waste water so that waste water is alkaline rich and is in excess of what is required to precipitate insoluble and heavy metal compounds when the waste water is evaporated via contact with the flue gas in the evaporator 7. The presence of excess amounts of the alkaline reagent within the waste water can also help prevent corrosion and reduce pollutant emissions by capturing acid gas elements within the flue gas such as hydrogen chloride (HCl), hydrogen fluoride (HF), sulfur dioxide ($SO_2$), sulfur trioxide ($SO_3$), and sulfuric acid ($H_2SO_4$) and forming solid particulates such as calcium sulfite ($CaSO_3$), calcium sulfate ($CaSO_4$), calcium chloride ($CaCl_2$), and calcium fluoride ($CaF_2$). Additionally, any unreacted alkaline reagent within the solids can provide a sorbent that continues to react within the flue gas to continue to capture additional acid gas elements as the flue gas is passed out of the evaporator device 7 and fed to an outlet conduit 8, which feeds the cooled and humidified flue gas and solid particulates to the first flow of flue gas after that flow of flue gas has passed out of the pre-heater 5. The presence of such sorbent elements can help prevent corrosion of downstream equipment by capturing acidic elements within the flue gas and provide additional sorbent for downstream collection of acid gas related elements to prevent the emission of such elements into the atmosphere.

In embodiments where a wet flue gas desulfurization system 13 is located downstream of the evaporator device, the capture of HCl in the flue gas upstream due to the alkaline reagent can reduce the need to purge waste water. The size of the evaporator device 7 can therefore be reduced for those embodiments as there would be a need for a smaller amount of flue gas required to evaporate the smaller amount waste water.

In addition, activated carbon or activated coke can be added to the waste water vessel 19 to add activated carbon or activated coke to the liquid waste water prior to the waste water being fed to the evaporator device 7. The presence of the activated carbon or activated coke can result in the adsorption of compounds of metal such as mercury, selenium and arsenic and can suppress the potential to evaporate such compounds when the waste water is evaporated in the evaporator device 7. Additionally, the presence of the activated carbon or activated coke in the liquid waste water can result in the adsorption of metal compounds (e.g. mercury) that may be present in the flue gas passed through the evaporator device 7.

In some embodiments, the activated carbon or activated coke can be mixed with the alkaline reagent prior to feeding the material to the waste water vessel 19. In other embodiments, the activated coke or activated carbon can be kept separate from the alkaline reagent and can be separately added to the waste water.

The first portion of the flue gas and solid particulates from the output conduit 8 of the evaporator device 7 can be merged with the second portion of the flue gas output from the pre-heater 5 in a conduit or vessel prior to feeding the combined first and second portions of the flue gas and solid particulates to the particulate collector 9. The particulate collector 9 can be connected to the evaporator device 7 and pre-heater 5 via one or more conduits for receiving the merged flue gas and solid particulates. The particulate collector 9 can be configured as a precipitator such as an electrostatic precipitator, or a filter such as a fabric filter. The particulate collector 9 can alternatively be configured as another type of particulate collector that is configured to separate solid particulates from the flue gas and/or precipitate solid particulates out of the flue gas for separating those solids from the flue gas.

The separated flue gas can subsequently be fed to a wet flue gas desulfurization system 13 via at least one conduit connecting the particulate connector 9 to the wet flue gas desulfurization system for the removal of sulfur from the flue gas prior to the flue gas being transported to a stack 15 such as a chimney or heat recovery steam generator for expelling to the atmosphere. At least one conduit may connect the wet flue gas desulfurization system to the stack 15 for the transport of flue gas to the stack 15. In alternative embodiments, a dry flue gas desulfurization system can be utilized instead of a wet flue gas desulfurization system.

Waste water from the wet flue gas desulfurization system 13 can be fed to the waste water vessel 19 as a source of the waste water. For instance, waste water from a purge stream reaction tank, primary hydrocyclone overflow or vacuum filtrate can be fed to the waste water vessel 19 via one or more conduits interconnecting the waste water vessel 19 to the wet flue gas desulfurization system 13. Additionally, waste water from at least one other waste water source 21 can be fed to the waste water vessel 19. For instance, waste water from cooling tower blowdown, storm and coal pile run-off, chemical cleaning waste, and/or ash pond overflow of a power plant can be collected or otherwise transported to the waste water vessel 19 to be retained therein. It is also contemplated that a source of waste water can be from another industrial party that is a customer of the operator of the apparatus who transports waste water to the operator of the apparatus for treatment of the waste water.

The solid particulates from the particulate collector that is separated from the flue gas can include solid material produced during the original combustion of fossil fuel in the boiler unit 1 that can be entrained within the flue gas. Additionally, the solids formed from the waste water being contacted with the flue gas to cool and humidify the flue gas and precipitates of the flue gas that can be formed or otherwise extracted via the particulate collector 9, such as fly ash, can be separated from the flue gas via the particulate collector 9. The solid particulates separated by the particulate collector 9 can be transported for storage, treatment or other distribution via at least one solid particulate conduit 11.

Figure 2:
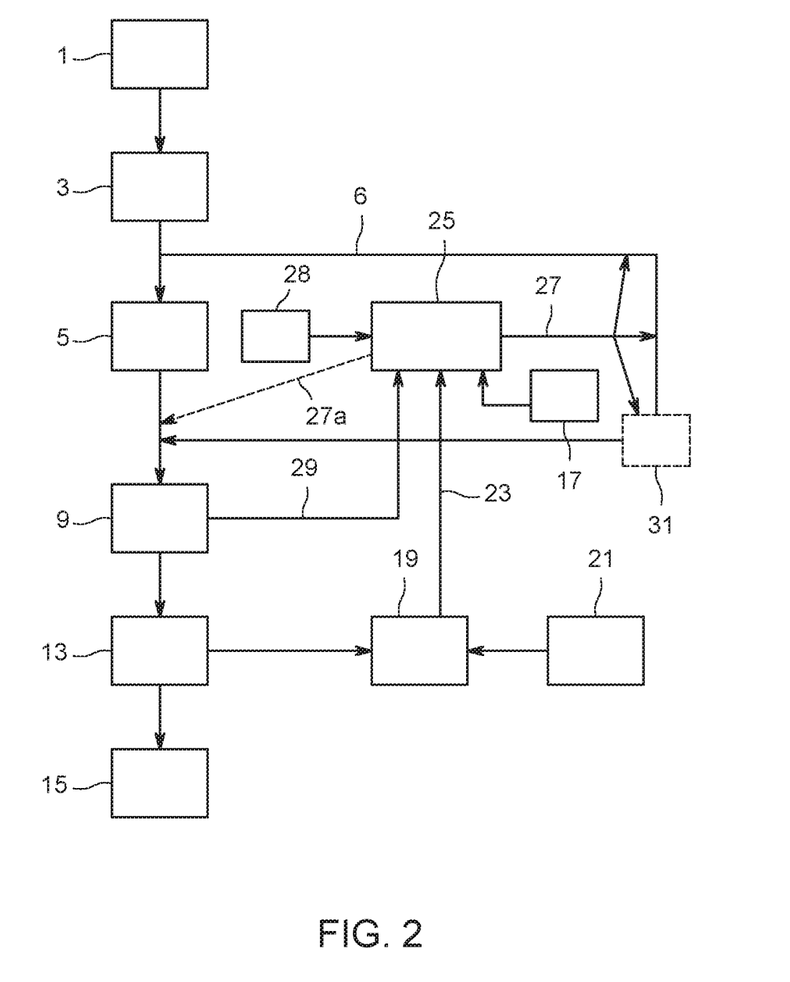
FIG. 2 is a block diagram of a second exemplified embodiment of an apparatus for evaporating waste water and reducing acid gas emissions.

In alternative embodiments, the waste water can be fed to a mixer device for mixing with an alkaline reagent, activated coke or activated carbon, and at least a portion of the solids separated by the particulate collector 9. FIG. 2 illustrates such an alternative embodiment.

As can be seen from FIG. 2, embodiments of the apparatus for evaporating waste water and reducing acid gas emissions can be configured so that a portion of flue gas emitted from a boiler unit 1 is fed to a bypass conduit 6 to bypass a pre-heater 5 after the flue gas has been passed through a nitrogen oxide removal unit 3 to remove nitrogen oxide components of the flue gas. Waste water from the wet flue gas desulfurization system 13 and at least one other waste water source 21 can be temporarily retained in a waste water vessel 19 such as a waste water holding tank prior to being fed through a conduit 23 to a mixer device 25 for mixing with an alkaline reagent fed to the mixer device 25 from an alkaline reagent source 17. For such embodiments, it is contemplated that the mixer device 25 can be configured as a mixer of a NID™ system that is provided by Alstom Power. Of course, other types of mixer devices can alternatively be used.

Conduits can connect the alkaline reagent source 17 and the waste water vessel 19 to the mixer device 25 for supplying these elements to the mixer device 25. An activated carbon source 28 or activated coke source can also be connected to the mixer device 25 via one or more conduits for feeding activated carbon or activated coke to the mixer device for mixing with the waste water. The mixer device 25 can also be connected to the particulate collector 9 by at least one solid particulate recycle conduit 29 so that at least a portion of the solid particulates separated by the particulate collector 9 can be fed to the mixer device 25. A portion of the solid particulate recycle conduit 29 can include one or more silos or vessels configured for temporary storage of solid particulates separated by the particulate collector 9 prior to the solid particulates being fed to the mixer device 25. In an alternative embodiment, solid particulates from the particulate collector 9 can be stored in a remote silo or solid particulate storage device that is connected to the solid particulate recycle conduit for recycling the solid particulates to the mixer device 25.

The mixer device 25 can receive the alkaline reagent, the solid material (e.g. solid particulates) from the particulate collector 9, the activated carbon or activated coke, and the liquid waste water. The mixer device 25 can agitate or otherwise mix these elements to combine the elements to form a mixture. The mixture formed by the mixer device 25 can be formed as a moist powder (e.g. a wet dust or moist dust) or a slurry. When formed as a moist powder, the mixture may have a water content of at least 1% water by weight or, more preferably, may have a content of between 2% and 5% water by weight. It is also contemplated that embodiments may be configured so that the mixer device forms a mixture having between 1% and 8% water by weight. In yet other embodiments, it is contemplated that the mixer device could be configured to form a moist powder having a water content that ranges from 1% water by weight to a content value that is over 8% water by weight.

The mixture formed via the mixer device 25 can subsequently be output from the mixer device. At least one mixture distribution conduit 27 can connect the mixer device 25 to the bypass conduit 6 to feed the mixture of the waste water, alkaline reagent, activated carbon or activated coke, and solid particulates to the flue gas passing through the bypass conduit. One or more nozzles or other dispersion mechanisms can be configured to disperse or spray the mixture within the bypass conduit 6 to feed the mixture to the flue gas. The mixture distribution conduit 27 can be configured so that the mixture formed by the mixer device 25 is dispersible within one discrete location of the bypass conduit 6 or is dispersible at multiple different spaced apart locations in the bypass conduit 6 to contact the flue gas passing through the bypass conduit 6. The flue gas and mixture can subsequently pass through the remaining portion of the bypass conduit and be subsequently merged with the flue gas passing out of the pre-heater 5. Alternative embodiments of the apparatus can be configured to allow any of the waste water streams or the alkali streams or the solid particulate from the particulate collector 9 to be added separately into the bypass conduit 6 or into an evaporator vessel 31.

The portion of the bypass conduit 6 through which both the flue gas and mixture pass can be considered a type of evaporator device as the flue gas is cooled and humidified as it is exposed to and directly contacts the waste water within the mixture and the solid particulates within the mixture are dried as they are exposed to and directly contact the hot flue gas.

It is contemplated that the bypass conduit 6 can include at least one evaporator vessel 31 (shown in broken line in FIG. 2) that is configured to receive the flue gas and the mixture from the mixer device 25 to retain these elements within the evaporator vessel 31 for a pre-specified residence time to ensure sufficient mixing of the mixture with the flue gas to ensure the waste water from the mixture is sufficiently evaporated, the solid particulates of the mixture are sufficiently dried, and the flue gas is sufficiently cooled and humidified to meet a particular set of design criteria. As such, the evaporator vessel 31 can be considered to be a type of evaporator device. The portion of the conduit through which the flue gas passes after being fed the mixture and prior to being fed to the particulate collector 9 (e.g. the evaporator vessel 31) can be a J-duct reactor or J-duct of an Alstom Power NID™ system, or other type of duct having at least one vertically extending section that provides a sufficient residence time for the flue gas and mixture to ensure the flue gas is cooled to a pre-specified temperature and the solid particulates are dried to a pre-specified degree of dryness as the flue gas and particulates move vertically through the duct to the particulate collector 9. The mixture from the mixer device 25 can be fed directly within the evaporator vessel 31 or can be fed to the bypass conduit 6 prior to the flue gas and mixture being passed through the evaporator vessel 31.

After the flue gas flow passing out of the pre-heater 5 is merged with the flue gas, evaporated waste water, and solid particulates from the bypass conduit 6, these combined materials can be fed to the particulate collector 9 for separating the solid particulates from the flue gas. The solid particulates can be separated such that at least a portion of the separated solid material is recycled to the mixer device via recycle conduit 29. Another portion of the solid material can be output for subsequent treatment and distribution.

The flue gas separated from the solid particulates can be passed from the particulate collector 9 to a wet flue gas desulfurization system 13 for subsequent processing prior to being emitted out of a stack 15 such as a heat steam recovery generator or chimney. Waste water from the wet flue gas desulfurization system 13 as well as waste water from other plant operations or waste water from another waste water source 21 can be fed to the waste water vessel 19 for retention and subsequent use in the mixer device 25. In alternative embodiments, a dry flue gas desulfurization system can be utilized instead of a wet flue gas desulfurization system.

It is contemplated that in addition to waste water from power plant or industrial plant operations, waste water from other industrial facilities can be conveyed via pipes, tubes or other conduits to the waste water vessel 19. In some embodiments, a power plant operator may therefore charge a service fee for processing of waste water from industrial customers or other third parties that have need for waste water removal in addition to utilizing its own waste water in operations of the apparatus for evaporating waste water and reducing acid gas emissions.

In some embodiments, it is contemplated that the mixture formed in the mixer device 25 is passable to the flue gas after the flue gas has passed through the pre-heater 5 via at least one mixture feed conduit 27a (shown in broken line in FIG. 2) such that the flue gas can be cooled and humidified and the solid particulates within the mixture can be dried within a conduit or vessel transporting the flue gas to the particulate collector 9 downstream of the pre-heater 5 (e.g. after the flue gas has passed through the pre-heater 5) and prior to the flue gas, evaporated waste water, and solid particulates being passed through the particulate collector 9. Such an embodiment of the apparatus can be advantageous as it may provide a relatively small footprint that permits a power plant or industrial plant to be retrofitted with the apparatus with minimal capital costs being incurred.

For instance, bypass conduit 6 may not be needed for embodiments of the apparatus that are configured so that the mixture formed by the mixer device 25 is fed to all the flue gas after it has exited the pre-heater 5 and before it has been fed to the particulate collector 9 via at least one mixture feed conduit 27a. Further, it is contemplated that a pre-existing conduit within a power plant or industrial plant that transports flue gas from a pre-heater to a particulate collector can be utilized with minimal modification for the transport of the mixture and flue gas to the particulate collector 9. The portion of this conduit that transports both the mixture and the flue gas can be configured so that the mixture has a sufficient residence time with the flue gas passing through that conduit to ensure the flue gas is sufficiently cooled and the solid particulates within the mixture are sufficiently dried prior to entering the particulate collector 9. For example, the flue gas can be at a temperature of between 250° F. and 400° F., or between 120° C. and 205° C. after passing out of the pre-heater 5 and be subsequently further cooled upon contacting the mixture from the mixer device 25 to a temperature of between 180° F. and 300° F. or between 80° C. and 150° C. so that the solid particulates are sufficiently dried and the flue gas is cooled and humidified prior to being fed to the particulate collector 9.

In some embodiments of the apparatus, it is contemplated that multiple different mixture feed conduits can be utilized for feeding the mixture from the mixer device 25 to the flue gas at multiple different spaced apart locations within the apparatus or power plant. For example, a portion of the mixture could be fed to the flue gas via a mixture feed conduit prior to the flue gas being passed through the pre-heater 5 and another portion of the mixture could be fed to the flue gas after the flue gas is passed through the pre-heater 5.

The flow rate, temperature, and/or humidity of the flue gas within the bypass conduit 6 or within another conduit feeding the flue gas to the particulate collector 9 can be monitored via at least one flow sensor, at least one temperature sensor, and/or at least one humidity sensor to control operations of the mixer device 25 to ensure that the flue gas is cooled to at least a pre-specified temperature and has a pre-specified humidity level. For example, the flow rate of waste water fed to the mixer device 25 or the amount of water mixed within the mixture fed to the flue gas can be adjusted based upon the temperature and/or humidity level detected by the one or more sensors to maintain the flue gas within the bypass conduit 6 or within the conduit feeding the flue gas to the particulate collector 9 at a pre-specified temperature range such as at a temperature of between 200° F. and 300° F., at a temperature of between 90° C. and 150° C. or at a temperature that is at least 10° C. or 30° F. above its adiabatic saturation temperature to avoid wetting of the solid particulates and/or corrosion.

Figure 3:
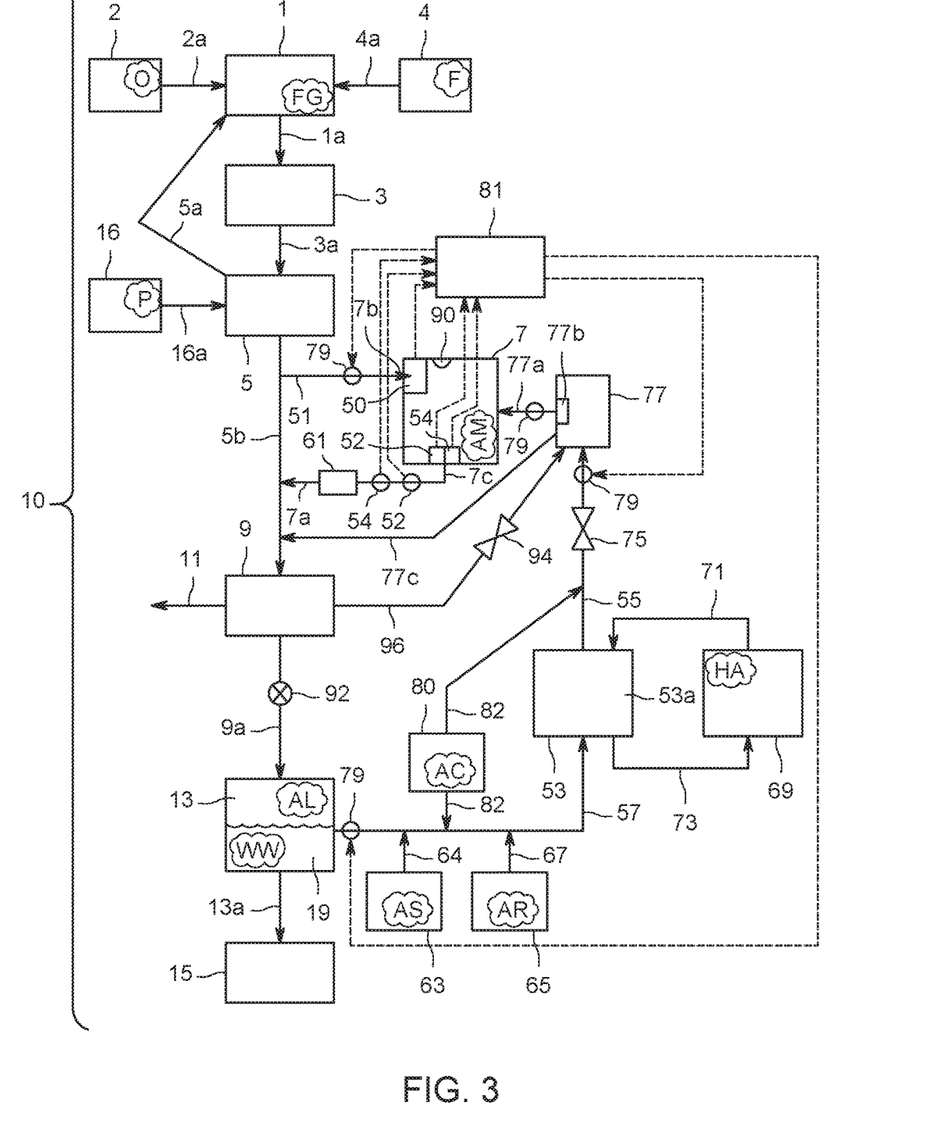
FIG. 3 is a schematic block diagram of another exemplified embodiment of an apparatus for evaporating waste water and reducing flue gas acid gas emissions.

Referring to FIG. 3, a power plant or an industrial plant system 10 includes a combustion unit 1 that combusts a fuel F producing steam and/or a flue gas FG, such as a gas turbine or a boiler unit. The combustion unit 1 is supplied at least one oxygen containing gas flow O, e.g., an oxidant flow such as air, $O_2$ gas, or another type of gas containing $O_2$ gas, from a gas supply 2 via pipe 2a, and a fuel F from a fuel supply 4 via duct 4a for combustion of the fuel F within combustion unit 1. The combusted fuel F may be a fossil fuel such as coal, oil, or natural gas. In addition to steam, flue gas FG may be formed via combustion of the fuel F and emitted by the combustion unit 1. The produced steam may be transported to a turbine (not shown) for use in generating electricity or put to other uses, e.g., district heating, process heating, and the like. The generated flue gas FG may be transported to other system 10 equipment for transfer of heat energy from the flue gas FG prior to emitting at least a portion of the flue gas FG, after treatment of the flue gas FG, to the atmosphere.

One or more conduits 1a connect the combustion unit 1 to a nitrogen oxide removing unit 3 for a flow of flue gas FG from the combustion unit 1 to the nitrogen oxide removing unit 3. The nitrogen oxide removing unit 3 is configured as a selective catalytic reduction (SCR) unit, a selective non-catalytic reduction (SNCR) unit, or another type of system 10 equipment configured to remove nitrogen oxides, e.g., $NO_2$, $N_2O_3$, $NO_x$, from the flue gas FG.

After flow through the nitrogen oxide removing unit 3, the flue gas FG flows into a pre-heater 5 via at least one conduit 3a connecting the nitrogen oxide removing unit 3 to the pre-heater 5. A fluid P from a fluid supply 16, such as air from the atmosphere, is supplied to the pre-heater 5 via pipe 16a to produce heated fluid P prior to the heated fluid P being supplied to the combustion unit 1 via duct 5a for use in combusting the fuel F. The flue gas FG flows through the pre-heater 5 prior to being split into multiple streams for further processing or use. For example, a first portion of the flue gas FG is passed from pre-heater 5 through a bypass conduit 51 for supply thereof to a fluidly connected evaporator device 7. From evaporator device 7, flue gas FG flows via duct 7a to duct 5b, which fluidly connects pre-heater 5 to a particulate collector 9. This first portion of the flue gas FG that flows to the evaporator device 7 is considered a "slipstream" in some embodiments of the system 10. A second portion of the flue gas FG flows directly from pre-heater 5 to a particulate collector 9 via fluidly connected duct 5b.

The evaporator device 7 can be a vessel sized to receive the flue gas FG and liquid waste water WW from a wet flue gas desulfurization system 13 arranged downstream of the evaporator device 7. As such, liquid waste water WW from wet flue gas desulfurization system 13 flows through waste water conduit 57, a heat exchanger 53, a waste water conduit 55, a valve 75, a flash vessel 77, and a duct 77a fluidly connected to evaporator device 7. Waste water WW is supplied from wet flue gas desulfurization system 13 to the evaporator device 7 at a pre-specified flow rate or a controlled flow rate as described in more detail below.

The evaporator device 7 may be configured as a spray dryer, or other device or vessel capable of directly contacting a waste water stream with flue gas FG in such a way as to cool the flue gas FG to a reduced temperature of about 180° F. to about 300° F., or about 80° C. to about 150° C. The evaporator device 7 may include a rotary atomizer, a dual fluid nozzle, or other dispersal element 90 to spray or otherwise disperse the waste water WW into the flue gas FG for cooling and humidifying the flue gas FG and for evaporating the waste water WW. Likewise, dispersal element 90 may be used to disperse a moist absorbent material AM within evaporator device 7.

Supplying a portion of the flue gas FG generated by the combustion unit 1 after pre-heater 5 for supply to the evaporator device 7 achieves use of relatively hot flue gas FG, e.g., flue gas FG having a temperature of about 250° F. to about 400° F., or about 120° C. to about 205° C., in the evaporator device 7. The above temperature range is representative of flue gas FG temperatures from a steam producing power plant system 10 application. Other industrial or gas fired system applications may generate flue gas FG having a different temperature and/or temperature range. Use of relatively hot flue gas FG of a temperature or a temperature range described above in evaporator device 7 achieves evaporation of a relatively larger amount of waste water WW as compared to an amount of waste water WW evaporated under consistent but lower temperature conditions. Heating and/or evaporation of the waste water WW in heat exchanger 53 further increases the waste water WW evaporation capabilities of evaporation device 7. The temperature of the waste water WW leaving the heat exchanger 53 is about 175° F. to about 350° F., or about 80° C. to about 180° C. As noted above, to achieve desired waste water WW temperatures, the waste water WW is passed through heat exchanger 53. Also passed through heat exchanger 53 is a heat exchange agent HA that is circulated through heat exchanger 53 typically in a direction opposite that of the waste water WW. The heat exchange agent HA is heated by a heat source 69 such as system 10 steam. After the heat exchange agent HA is heated, it flows via conduit 71 to heat exchanger 53 in which heat energy is transferred from the heat exchange agent HA to the waste water WW thereby heating the waste water WW. After transferring heat energy to the waste water WW, the cooled heat transfer agent HA circulates back to the heat source 69 via conduit 73 for reheating.

In the subject system 10, heat exchanger 53 is operative for heating and/or evaporation of the waste water WW produced in wet flue gas desulfurization system 13 to produce heated waste water WW and/or steam. In operation, waste water WW from wet flue gas desulfurization system 13 is pumped through fluidly connected waste water conduit 57 into interior 53a of heat exchanger 53. As waste water WW flows through interior 53a of heat exchanger 53, heating and/or evaporation of the waste water WW will occur depending on the specific temperature and pressure conditions existing in the heat exchanger 53 to produce heated waste water WW and/or steam. Within interior 53a of heat exchanger 53, the heat exchange agent HA is used to transfer heat energy to the waste water WW flowing therein to produce heated waste water WW and/or steam. The resultant cooled heat exchange agent HA continues circulation from heat exchanger 53 to the heat source 69 via fluidly connected conduit 73. The produced heated waste water WW and/or steam from the heat exchanger 53, flows via waste water conduit 55 through valve 75 into fluidly connected flash vessel 77. Valve 75 is operable for pressure reduction in waste water conduit 55. A pressure reduction in waste water conduit 55 via valve 75, results in expansion and flash evaporation of the waste water WW in flash vessel 77, with collection of any remaining waste water WW in flash vessel 77. Upstream of valve 75 in waste water conduit 55, is a pressure of about 1 bar (absolute) to about 10 bar (absolute), or more preferably, about 1.4 bar (absolute) to about 6 bar (absolute). Downstream of valve 75 in waste water conduit 55, is a pressure of about atmospheric to about 1.3 bar (absolute), or more preferably, about negative 1000 mm water column to about ambient pressure. Any remaining waste water WW collected in flash vessel 77 flows together with suspended particulate matter via duct 77a into fluidly connected evaporator device 7. Further, evaporated waste water WW from flash vessel 77 may flow via duct 77c to fluidly connected duct 5b upstream of particulate collector 9 to moisten flue gas FG flowing therethrough. Optionally, the heat exchanger 53 may be a re-boiler or kettle-type boiler where an open space in the re-boiler or kettle-type boiler above the waste water WW serves also as the flash vessel 77, thereby incorporating a flash vessel 77 therein. As such, no separate flash vessel 77 is required.

An advantage of the subject system 10 is that lower quality heat energy may be used for waste water WW evaporation. Waste heat and/or lower quality steam can be used as a heat source in heat exchanger 53, which thereby allows for using a lower temperature flue gas FG in the evaporator device 7. The overall effect is a significant improvement in system 10 thermal efficiency.

Flue gas FG supplied from duct 5b downstream of the pre-heater 5 may have a pressure lower than that of flue gas FG supplied from conduit 3a upstream of the pre-heater 5. Hence, to facilitate circulation of the flue gas FG through conduit 51, evaporator device 7, and output conduit 7a, a pump or fan 61 is arranged in conduit 7a. Pump or fan 61 is operative for driving the flow of the flue gas FG through the evaporator device 7. Pump or fan 61 is utilized in system 10 as needed for flue gas FG flow rate control to maintain the flue gas FG flow rate within a desired predetermined flow rate range.

The flow rate of flue gas FG entering the evaporator device 7, the temperature of the flue gas FG, and the humidity of the flue gas FG exiting the evaporator device 7, may each be monitored via at least one flow sensor 50 adjacent to the inlet 7b of the evaporator device 7, at least one temperature sensor 52, and at least one humidity sensor 54 positioned adjacent the outlet 7c of the evaporator device 7 or positioned within the output conduit 7a of the evaporator device 7, to control operation conditions of the evaporator device 7. Control of operation conditions of the evaporator device 7 enables flue gas FG cooling to at least a predetermined temperature or temperature range, and optionally, or in addition thereto, a predetermined level of humidity. The flow rate of flue gas FG flowing through conduit 51 and/or waste water WW supplied to the evaporator device 7 from flash vessel 77 via duct 77a and heat exchanger 53 via conduit 55, may be adjusted using one or more valves 79 controlled manually or controlled electronically by control device 81. Control device 81 adjustment of the one or more valves 79 is based upon the flow rate, temperature, and humidity level of the flue gas FG as measured by the one or more sensors 50, 52, 54. Measurements measured by the one or more sensors 50, 52, 54 are electronically sent to control device 81. Control device 81 is programmed with the desired predetermined measurements for the system 10 for use in controlling valves 79. As such, the flue gas FG flow rate may be maintained while the waste water WW flow rate is controlled via one or more valves 79 to achieve the desired predetermined temperature of the waste water WW as measured by a temperature sensor 77b in flash vessel 77, and the desired predetermined temperature and humidity conditions of the flue gas FG as measured by at least one temperature sensor 52, and at least one humidity sensor 54 positioned adjacent the outlet 7c of the evaporator device 7, or positioned within the output conduit 7a of the evaporator device 7.

For example, the flue gas FG may be continuously or intermittently measured to maintain the flue gas FG within the output conduit 7a at a pre-specified temperature range, such as a temperature range between about 180° F. to about 300° F., or about 80° C. to about 150° C. As another example, the temperature of the flue gas FG within the evaporator device 7 and/or within the output conduit 7a may be continuously or intermittently measured to maintain the flue gas FG at a temperature of at least about 30° F., about 10° C., above its adiabatic saturation temperature to avoid wetting of any solid particles entrained therein and/or corrosion thereby. In the event the flue gas FG is measured to be at a temperature below a predetermined temperature threshold, through adjustment of valve 79, an increased or a relatively larger amount of flue gas FG may be diverted into conduit 51 for supply to the evaporator device 7, and/or a decreased or a relatively smaller amount of waste water WW may be supplied to the evaporator device 7, so that a lesser or a smaller amount of waste water WW contacts the flue gas FG thereby decreasing the cooling thereof. In the event the flue gas FG is measured to be at a temperature above a predetermined temperature threshold, through adjustment of valve 79, an increased or a relatively larger amount of waste water WW may be supplied to the evaporator device 7 and/or a decreased or a relatively smaller amount of flue gas FG may be supplied through conduit 51 to the evaporator device 7, so that the waste water WW contacts a lesser or a smaller amount of the flue gas FG thereby increasing the cooling thereof. As an option, in addition to one or more valves 79 being controlled manually or controlled electronically by control device 81, other system equipment such as other valves, pumps, fans, sensors, dampers, supplies, and the like, may be controlled manually, or be in communication with and/or electronically controlled by control device 81. Such further electronic communication/electronic control involving control device 81 is not illustrated in FIG. 3 in the interest of preserving clarity within FIG. 3. However, control device 81 may be used for communication with and control of other system equipment such as other valves, pumps, fans, sensors, dampers, supplies, and the like, to affect electronic system 10 operating parameter adjustments for operation of system 10 in accordance with predetermined desired operating parameters for system 10, programmed into control device 81.

The waste water WW fed to the evaporator device 7 can include suspended particulate matter within the waste water WW. The waste water WW can also include elements such as insoluble and heavy metal compounds that can precipitate out of the waste water WW as the waste water WW is heated and/or evaporated in heat exchanger 53, prior to flash evaporation in the flash vessel 77 and evaporation in evaporator device 7. When suspended particulate matter is present within the waste water WW, the suspended particulate matter can improve drying operations.

In an example that may be preferred for at least some applications of system 10, particulate matter is added to the waste water WW to facilitate evaporation of the waste water WW and to effect drying of the dissolved and suspended particulate matter to avoid deposition thereof in downstream conduits and vessels. For instance, separated solids collected in the particulate collector 9 and/or solid byproducts produced in the wet flue gas desulfurization system 13 may be combined and supplied as an anti-scaling agent AS from an anti-scaling agent source 63 via duct 64 to the waste water WW for mixing therewith. The mixing of the anti-scaling agent AS within the waste water WW may occur in the waste water conduit 57, prior to the waste water WW being fed to the heat exchanger 53, flash vessel 77, and evaporator device 7.

As noted above, the liquid waste water WW can also include other materials that may be mixed or added therein. For example, an alkaline reagent AR such as lime, hydrated lime, sodium carbonate, trona, or alkaline fly ash can be added to the waste water WW. An alkaline reagent source 65 such as a container retaining the alkaline reagent AR can be connected to the waste water conduit 57 by one or more pipes 67 or other conduits for feeding the alkaline reagent AR to the waste water WW while the waste water WW flows through the waste water conduit 57.

A pre-specified amount of alkaline reagent AR can be fed to the waste water WW so that waste water WW is alkaline rich and is in excess of what is required to precipitate elements such as insoluble and heavy metal compounds from the waste water WW when the waste water WW is evaporated via contact with the flue gas FG in the evaporator device 7. The presence of excess amounts of the alkaline reagent AR within the waste water WW can also help prevent corrosion and reduce emissions by capturing acid gases within the flue gas FG, such as hydrogen chloride (HCl), hydrogen fluoride (HF), sulfur dioxide ($SO_2$), sulfur trioxide ($SO_3$), and sulfuric acid ($H_2SO_4$), and forming suspended particulate matter carried in the waste water WW, such as calcium sulfite ($CaSO_3$), calcium sulfate ($CaSO_4$), calcium chloride ($CaCl_2$), and calcium fluoride ($CaF_2$). Additionally, any unreacted alkaline reagent AR entrained within the flue gas FG continues to react within the flue gas FG to capture additional acid gases as the flue gas FG flows from the evaporator device 7 through the outlet conduit 7a supplying the cooled and humidified flue gas FG to the flow of flue gas FG flowing out of the pre-heater 5 in conduit 5b. The presence of such unreacted alkaline reagent AR entrained within the flue gas FG can help to prevent corrosion of downstream system 10 equipment by capturing acid gases within the flue gas FG and to thereby prevent emission of the acid gases into the atmosphere.

As in the subject system 10, where a wet flue gas desulfurization system 13 is located downstream of the evaporator device 7, capture of acid gases in the flue gas FG upstream of the wet flue gas desulfurization system 13 due to the presence of unreacted alkaline reagent AR, can reduce the need to purge waste water WW from the wet flue gas desulfurization system 13 as often.

In addition, activated carbon or activated coke AC can be added to the waste water WW via carbon supply 80 via duct 82 fluidly connected to conduit 57 and/or conduit 55. As such, activated carbon or activated coke AC may be added to the liquid waste water WW prior to the waste water WW being fed to the flash vessel 77 and evaporator device 7. The presence of the activated carbon or activated coke AC can result in the adsorption of elements such as insoluble and heavy metal compounds, such as mercury, selenium and arsenic, and can suppress the potential to evaporate such elements when the waste water WW is evaporated in the evaporator device 7. Additionally, the presence of the activated carbon or activated coke AC in the liquid waste water WW can result in the adsorption of elements such as insoluble and heavy metal compounds, e.g., mercury, that may be present in the flue gas FG flowing through the evaporator device 7.

In some embodiments, the activated carbon or activated coke AC can be mixed with the alkaline reagent AR prior to feeding the mixed material from alkaline reagent source 65 via pipe 67 to the waste water conduit 57. In other embodiments, the activated coke or activated carbon AC can be kept separate from the alkaline reagent AR and can be separately added to the waste water WW as illustrated and described above.

The first portion of the flue gas FG from the output conduit 7a of the evaporator device 7 can be merged with the second portion of the flue gas FG output from the pre-heater 5 in conduit 5b prior to feeding these combined first and second portions of the flue gas FG, i.e., merged flue gas FG, to the particulate collector 9. The particulate collector 9 is fluidly connected to the evaporator device 7 via conduits 7a and 5b, and to the pre-heater 5 via conduit 5b for receiving the merged flue gas FG. The particulate collector 9 can be configured as a precipitator such as an electrostatic precipitator, or a filter such as a fabric filter. The particulate collector 9 can alternatively be configured as another type of particulate collector that is configured to separate solid particles and/or particulate matter from the flue gas FG as separated solids.

The flue gas FG flowing from the particulate collector 9 flows to the wet flue gas desulfurization system 13 via at least one conduit 9a connecting the particulate connector 9 to the wet flue gas desulfurization system 13. Wet flue gas desulfurization system 13 uses a dispersed absorbent liquid AL, e.g., an alkaline reagent in water, to remove sulfur oxides from the flue gas FG to produce treated flue gas FG prior to the treated flue gas FG flowing via conduit 13a to a stack 15, such as a chimney or heat recovery steam generator for expelling the treated flue gas FG to the atmosphere. Waste water WW produced in the wet flue gas desulfurization system 13 is supplied to the heat exchanger 53 via waste water conduit 57.

The separated solids from the particulate collector 9 can include solid particles produced during the original combustion of fossil fuel F in the combustion unit 1 entrained within the flue gas FG. Additionally, any particulate matter formed from the waste water WW contact with the flue gas FG while cooling and humidifying the flue gas FG, and thereby entrained within the flue gas FG, is separated from the flue gas FG via the particulate collector 9. The separated solids separated by the particulate collector 9 may be transported for storage, treatment or other distribution via at least one solids conduit 11. As another option, separated solids separated by the particulate collector 9 may be transported via duct 9b to flash vessel 77, and via duct 77a to evaporator device 7 to enhance evaporation of waste water WW in the evaporator device 7.

Disclosed herein is also a method of using system 10 for wet flue gas desulfurization with no waste water WW discharge. The method of using system 10 comprises using a wet flue gas desulfurization system 13 with a flow of absorbent liquid AL, e.g., an alkaline reagent in water, for wet flue gas desulfurization of a flue gas FG flowing therethrough to reduce flue gas acid gas and thereby produce treated flue gas, heating and/or evaporating waste water WW from the flue gas desulfurization system 13 in a heat exchanger 53 to produce heated waste water WW and/or steam, depressurizing, at least partly evaporating the waste water WW, and collecting any remaining waste water WW in flash vessel 77, supplying the collected waste water WW from the flash vessel 77 to an evaporator device 7 for evaporation thereof, and releasing the treated flue gas FG from the wet flue gas desulfurization system 13 to the environment.

Figure 4:
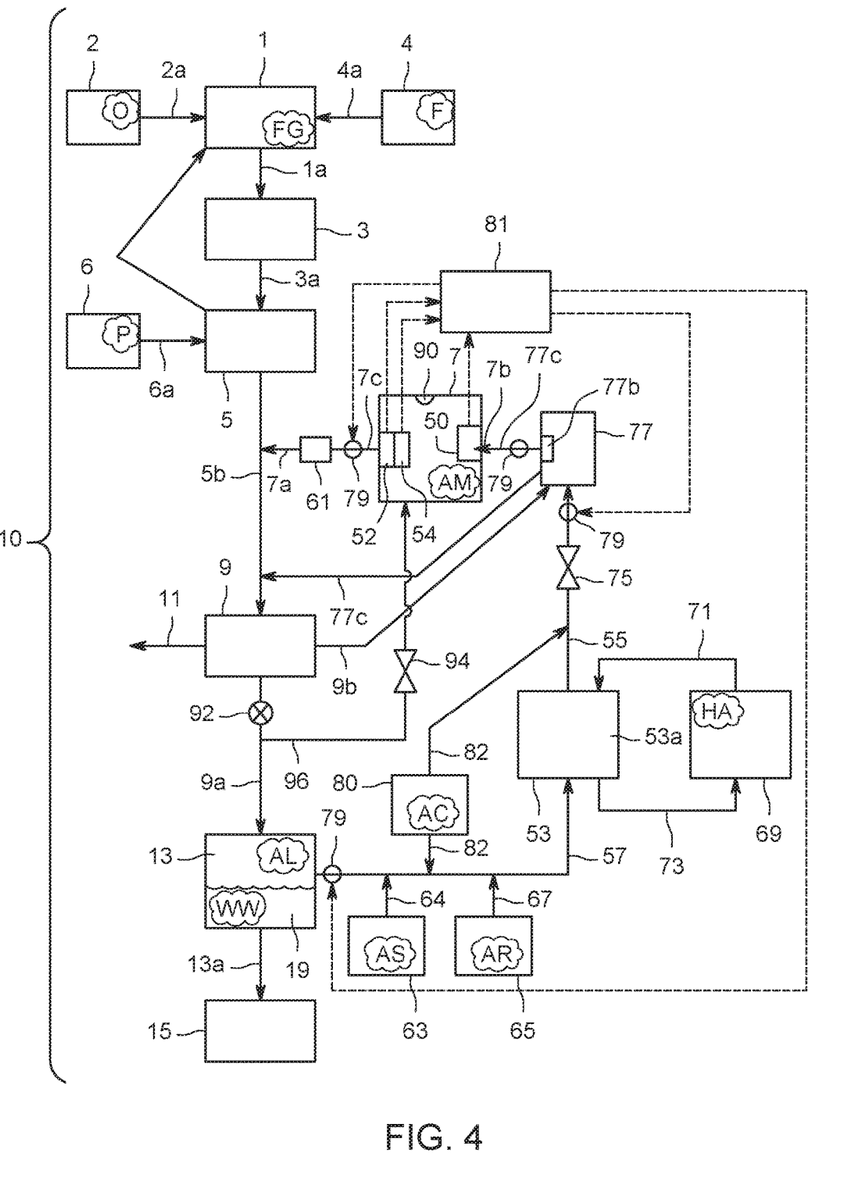
FIG. 4 is a schematic block diagram of still another exemplified embodiment of an apparatus for evaporating waste water and reducing flue gas acid gas emissions.

Referring to FIG. 4, a power plant or an industrial plant system 10 includes a combustion unit 1 that combusts a fuel F producing steam and/or a flue gas FG, such as a gas turbine or a boiler unit. The combustion unit 1 is supplied at least one oxygen containing gas flow O, e.g., an oxidant flow such as air, $O_2$ gas, or another type of gas containing $O_2$ gas, from a gas supply 2 via pipe 2a and a fuel F from a fuel supply 4 via duct 4a for combustion of the fuel F within combustion unit 1. The combusted fuel F may be a fossil fuel F such as coal, oil, or natural gas. In addition to steam, flue gas FG may be formed via combustion of the fuel F and emitted by the combustion unit 1. The produced steam may be transported to a turbine (not shown) for use in generating electricity or put to other uses, e.g., district heating, process heating, and the like. The generated flue gas FG may be transported to other system 10 equipment for transfer of heat energy from the flue gas FG prior to emitting at least a portion of the flue gas FG, after treatment of the flue gas FG, to the atmosphere.

One or more conduits 1a connect the combustion unit 1 to a nitrogen oxide removing unit 3 for a flow of flue gas FG from the combustion unit 1 to the nitrogen oxide removing unit 3. The nitrogen oxide removing unit 3 is configured as a selective catalytic reduction (SCR) unit, a selective non-catalytic reduction (SNCR) unit, or another type of equipment configured to remove nitrogen oxides, e.g., $NO_2$, $N_2O_3$, $NO_x$, from the flue gas FG.

After flow through the nitrogen oxide removing unit 3, the flue gas FG flows through a pre-heater 5 via at least one conduit 3a connecting the nitrogen oxide removing unit 3 to the pre-heater 5. A fluid P from a fluid supply 6, such as air from the atmosphere, is supplied to the pre-heater 5 via pipe 6a to produce heated fluid P prior to the heated fluid P being supplied to the combustion unit 1 via duct 5a for use in combusting the fuel F. The flue gas FG flows through the pre-heater 5 and to a particulate collector 9 via duct 5b. Following flue gas FG flow through particulate collector 9 wherein solids are separated from the flue gas FG as separated solids and collected in the particulate collector 9, the flue gas FG flows through conduit 9a and is split into multiple streams for further processing or use. For example, a first portion of the flue gas FG is passed through a bypass conduit 96 for supply thereof to a fluidly connected evaporator device 7. From evaporator device 7, flue gas FG flows via duct 7a to fluidly connected duct 5b. Accordingly, when the flue gas FG is split in conduit 9a, a first portion of the flue gas FG that flows to the evaporator device 7 is considered a "slipstream" in some embodiments of the system 10. A second portion of the flue gas FG flows directly from the particulate collector 9 via fluidly connected conduit 9a to wet flue gas desulfurization system 13.

The evaporator device 7 can be a vessel sized to receive the flue gas FG and liquid waste water WW from a wet flue gas desulfurization system 13 arranged downstream of the evaporator device 7. As such, liquid waste water WW from wet flue gas desulfurization system 13 flows through waste water conduit 57, a heat exchanger 53, a waste water conduit 55, a valve 75, a flash vessel 77, and a duct 77a fluidly connected to evaporator device 7. Waste water WW is supplied from wet flue gas desulfurization system 13 to the evaporator device 7 at a pre-specified flow rate or a controlled flow rate as described in more detail below.

The evaporator device 7 may be configured as a spray dryer or other device or vessel capable of directly contacting a waste water WW stream with flue gas FG so as to cool the flue gas FG to a reduced temperature of about 180° F. to about 300° F., or about 80° C. to about 150° C. The evaporator device 7 may include a rotary atomizer, a dual fluid nozzle, or other dispersal element 90 to spray or otherwise disperse the waste water WW into the flue gas FG for cooling and humidifying the flue gas FG and evaporating the waste water WW. Likewise, dispersal element 90 may be used to disperse a moist absorbent material AM within evaporator device 7.

Supplying a portion of the flue gas FG generated by the combustion unit 1 after particulate collector 9 for supply to the evaporator device 7 achieves use of flue gas FG having a temperature of about 250° F. to about 400° F., or about 120° C. to about 205° C., in the evaporator device 7. The above temperature range is representative of flue gas FG temperatures from a steam producing power plant system 10 application. Other industrial or gas fired system applications may generate flue gas FG having a different temperature and/or temperature range. Heating and/or evaporation of the waste water WW in heat exchanger 53 further increases the waste water WW evaporation capabilities of evaporation device 7. The temperature of the waste water WW leaving the heat exchanger 53 is about 175° F. to about 350° F., or about 80° C. to about 180° C. As noted above, to achieve desired waste water WW temperatures, the waste water WW is passed through heat exchanger 53. Also passed through heat exchanger 53 is a heat exchange agent HA that is circulated through heat exchanger 53 in a direction typically opposite that of the waste water WW. The heat exchange agent HA is heated by a heat source 69 such as system 10 steam. After the heat exchange agent HA is heated to produce heated heat exchange agent HA, the heated heat exchange agent HA flows via conduit 71 to heat exchanger 53 in which heat energy is transferred from the heated heat exchange agent HA to the waste water WW thereby heating and/or evaporating the waste water WW. After transferring heat energy to the waste water WW, the cooled heat transfer agent HA circulates back to the heat source 69 via conduit 73 for reheating.

In the subject system 10, heat exchanger 53 is operative for heating and/or evaporation of the waste water WW produced in and collected by wet flue gas desulfurization system 13. In operation, waste water WW from wet flue gas desulfurization system 13 flows through fluidly connected waste water conduit 57 into interior 53a of heat exchanger 53. As waste water WW flows through interior 53a of heat exchanger 53, heating and/or evaporation of the waste water WW will occur depending on the specific temperature and pressure conditions existing in the heat exchanger 53 to produce heated waste water WW and/or steam. Within interior 53a of heat exchanger 53, the heated heat exchange agent HA is used to transfer heat energy to the waste water WW flowing therein. The resultant cooled heat exchange agent HA continues circulation from heat exchanger 53 to the heat source 69 via fluidly connected conduit 73. Following heating and/or evaporation of the waste water WW in the heat exchanger 53, steam and/or heated waste water WW flows via waste water conduit 55 through valve 75 and into fluidly connected flash vessel 77. Valve 75 is operable for pressure reduction in waste water conduit 55. A pressure reduction in waste water conduit 55 via valve 75, results in expansion and flash evaporation of heated waste water WW in flash vessel 77, with any remaining waste water WW collected in flash vessel 77. Flash evaporation is defined herein as evaporation at a rate of about 40 to about 1000 liters of waste water WW per minute at a temperature of about 175° F. to about 350° F., or about 80° C. to about 180° C. under about partial vacuum to about 1.3 bar (absolute) pressure. Upstream of valve 75 in waste water conduit 55, is a pressure of about 1 bar (absolute) to about 10 bar (absolute), or more preferably, about 1.4 bar (absolute) to about 6 bar (absolute). Downstream of valve 75 in waste water conduit 55, is a pressure of about partial vacuum to about 1.3 bar (absolute), or more preferably, about negative 1000 mm water column to about ambient pressure for expansion and flash evaporation of heated waste water WW in flash vessel 77. Remaining waste water WW collected in flash vessel 77 flows together with suspended particulate matter via duct 77a into fluidly connected evaporator device 7. Further, evaporated waste water WW from flash vessel 77 may flow via duct 77c to fluidly connected duct 5b upstream of particulate collector 9 to moisten flue gas FG flowing therethrough. Optionally, the heat exchanger 53 may be a re-boiler or kettle-type boiler where an open space in the re-boiler or kettle-type boiler above the waste water WW serves also as the flash vessel 77, thereby incorporating a flash vessel 77 therein. As such, no separate flash vessel 77 is required.

An advantage of the subject system 10 is that heating and/or evaporating the waste water WW in heat exchanger 53 to produce heated waste water WW and/or steam for downstream expansion and flash evaporation in flash vessel 77, reduces the amount of waste water WW to be evaporated in evaporator device 7. As such, the evaporator device 7 may be fabricated at a relatively lower cost due to the relatively smaller size requirements thereof. The size of the evaporator device 7 may be reduced in the subject system 10 due to the relatively smaller amount of relatively higher temperature waste water WW as compared to systems configured utilizing relatively larger amounts of relatively lower temperature waste water WW. Heating and/or evaporation of waste water WW in heat exchanger 53 using heat and pressure achieves effective waste water WW evaporation using a relatively smaller sized evaporator device 7. In addition to capital and operational expense reductions based on fabrication and use of a relatively smaller evaporator device 7, the relatively smaller evaporator device 7 of the subject system 10 also occupies a relatively smaller footprint. Smaller footprint equipment is particularly advantageous in retrofitting existing systems within power plants or industrial plants possibly having relatively low space availability.

Flue gas FG supplied from conduit 9a downstream of the particulate collector 9 may have a pressure lower than that of flue gas FG supplied from conduit 3a upstream of the pre-heater 5. Hence, to facilitate circulation of the flue gas FG through conduit 96, evaporator device 7, and output conduit 7a, a pump or fan 61 is arranged in conduit 7a. Pump or fan 61 is operative for driving the flow of the flue gas FG through conduit 96, evaporator device 7, and output conduit 7a. Pump or fan 61 may be utilized in system 10 as needed for flue gas FG flow rate control to maintain the flue gas FG flow rate within a desired predetermined flow rate range. Pump or fan 61 in the subject system 10 is operative using relatively less power due to the relatively smaller amount of flue gas FG needed to evaporate the remaining waste water WW in evaporator 7 after at least partial evaporation has occurred in the heat exchanger 53 and/or flash vessel 77. Many times, system 10 will have a relatively large fan 92 in conduit 9a to increase the pressure in conduit 9a on the flue gas FG for flow thereof through the wet flue gas desulfurization system 13. In these cases, it may be advantageous to take a portion of flue gas FG from downstream of fan 92 to the evaporator device 7, thus avoiding the need for pump or fan 61.

The flow rate of flue gas FG entering the evaporator device 7, the temperature of the flue gas FG, and the humidity of the flue gas FG exiting the evaporator device 7 may be monitored via at least one flow sensor 50 adjacent to the inlet 7b of the evaporator device 7, at least one temperature sensor 52, and at least one humidity sensor 54 positioned adjacent the outlet 7c of the evaporator device 7 or positioned within the output conduit 7a of the evaporator device 7, to control operation conditions of the evaporator device 7. Control of operation conditions of the evaporator device 7 enables flue gas FG cooling to at least a predetermined temperature, and optionally or in addition to a predetermined level of humidity. The flow rate of flue gas FG flowing through conduit 96 to the evaporator device 7 may be adjusted using one or more dampers or valves 94 and/or using pump or fan 61 for control. Waste water WW supplied to the evaporator device 7 from flash vessel 77 via duct 77a, and thereto from heat exchanger 53 via conduit 55, may be adjusted using one or more valves 79 controlled manually or controlled electronically by control device 81 based upon the flow rate, temperature, and/or humidity level of the flue gas FG measured by the one or more sensors 50, 52, 54. Measurements measured by the one or more sensors 50, 52, 54 are electronically sent to control device 81. Control device 81 is programmed with the desired predetermined measurements for the system 10 for use in controlling valves 79. Likewise, the flue gas FG flow rate may be maintained while the waste water WW flow rate is controlled via one or more valves 79 to achieve the desired predetermined temperature of the waste water WW measured by a temperature sensor 77b in flash vessel 77 and the desired predetermined temperature and humidity conditions of the flue gas FG as measured by at least one temperature sensor 52, and at least one humidity sensor 54 positioned adjacent the outlet 7c of the evaporator device 7 or positioned within the output conduit 7a of the evaporator device 7.

For example, the flue gas FG may be continuously or intermittently measured to maintain the flue gas FG within the output conduit 7a at a pre-specified temperature range, such as a temperature range between about 180° F. to about 300° F., or about 80° C. to about 150° C. As another example, the temperature of the flue gas FG within the evaporator device 7 and/or within the output conduit 7a may be continuously or intermittently measured to maintain the flue gas FG at a temperature of at least about 30° F., or about 10° C., above its adiabatic saturation temperature to avoid wetting of any solid particles entrained therein and/or corrosion thereby. In the event the flue gas FG is measured to be at a temperature below a predetermined temperature threshold, through adjustment of valve 79, an increased or a relatively larger amount of flue gas FG may be diverted into conduit 96 for supply to the evaporator device 7, and/or a decreased or a relatively smaller amount of waste water WW may be supplied to the evaporator device 7 so that a lesser or a smaller amount of waste water WW contacts the flue gas FG thereby decreasing the cooling of the flue gas FG. In the event the flue gas FG is measured to be at a temperature above a predetermined temperature threshold, through adjustment of valve 79, an increased or a relatively larger amount of waste water WW may be supplied to the evaporator device 7 and/or a decreased or a relatively smaller amount of flue gas FG may be supplied through conduit 96 to the evaporator device 7 so that the waste water WW contacts a lesser or a smaller amount of the flue gas FG thereby increasing the cooling of the flue gas FG. As an option, in addition to one or more valves 79 being controlled manually or controlled electronically by control device 81, other system equipment such as other valves, pumps, fans, sensors, dampers, supplies, and the like, may be controlled manually, or be in communication with and/or electronically controlled by control device 81. Such further electronic communication/electronic control involving control device 81 is not illustrated in FIG. 4 in the interest of preserving clarity within FIG. 4. However, control device 81 may be used for communication with and control of other system equipment such as other valves, pumps, fans, sensors, dampers, supplies, and the like, to affect electronic system 10 operating parameter adjustments for operation of system 10 in accordance with predetermined desired operating parameters for system 10, programmed into control device 81.

The waste water WW fed to the evaporator device 7 can include suspended particulate matter within the waste water WW. The waste water WW can also include elements such as insoluble and heavy metal compounds that can precipitate out of the waste water WW as the waste water WW is heated and/or evaporated in heat exchanger 53, prior to flash evaporation in the flash vessel 77, and evaporation in evaporator device 7. When suspended particulate matter is present within the waste water WW, the suspended particulate matter can improve drying operations.

In an example that may be preferred for at least some applications of system 10, particulate matter is added to the waste water WW to facilitate evaporation of the waste water WW and to effect drying of the dissolved and suspended particulate matter to avoid deposition thereof in downstream conduits and vessels. For instance, separated solids collected in particulate collector 9 and/or solid byproducts produced in the wet flue gas desulfurization system 13 may be combined and supplied as an anti-scaling agent AS from an anti-scaling agent source 63 via duct 64 to the waste water WW for mixing therewith. The mixing of the anti-scaling agent AS within the waste water WW may occur in the waste water conduit 57, prior to the waste water WW being fed to the heat exchanger 53, flash vessel 77, and evaporator device 7.

As noted above, the waste water WW can also include other materials that may be mixed or added therein. For example, an alkaline reagent AR such as lime, hydrated lime, sodium carbonate, trona, or alkaline fly ash can be added to the waste water WW. An alkaline reagent source 65 such as a container retaining the alkaline reagent AR can be connected to the waste water conduit 57 by one or more pipes 67 or other conduits for feeding the alkaline reagent AR to the waste water WW while the waste water WW flows through the waste water conduit 57.

A pre-specified amount of alkaline reagent AR can be fed to the waste water WW so that waste water WW is alkaline rich and is in excess of what is required to precipitate elements such as insoluble and heavy metal compounds from the waste water WW when the waste water WW is evaporated via contact with the flue gas FG in the evaporator device 7. The presence of excess amounts of the alkaline reagent AR within the waste water WW can also help prevent corrosion and reduce emissions by capturing acid gases within the flue gas FG such as hydrogen chloride (HCl), hydrogen fluoride (HF), sulfur dioxide ($SO_2$), sulfur trioxide ($SO_3$), and sulfuric acid ($H_2SO_4$), and forming suspended particulate, matter carried in the waste water WW, such as calcium sulfite ($CaSO_3$), calcium sulfate ($CaSO_4$), calcium chloride ($CaCl_2$), and calcium fluoride ($CaF_2$). Additionally, any unreacted alkaline reagent AR entrained within the flue gas FG continues to react within the flue gas FG to capture additional acid gases as the flue gas FG flows from the evaporator device 7 through the outlet conduit 7a supplying the cooled and humidified flue gas FG to the flow of flue gas FG flowing out of the pre-heater 5 in conduit 5b. The presence of such unreacted alkaline reagent AR entrained within the flue gas FG can help to prevent corrosion of downstream system 10 equipment by capturing acid gases within the flue gas FG and to thereby prevent emission of the acid gases into the atmosphere.

As in the subject system 10 where a wet flue gas desulfurization system 13 is located downstream of the evaporator device 7, capture of acid gases in the flue gas FG upstream of the wet flue gas desulfurization system 13 due to the presence of unreacted alkaline reagent AR, can reduce the need to purge waste water WW from the wet flue gas desulfurization system 13 as often.

In addition, activated carbon or activated coke AC can be added to the waste water WW via carbon supply 80 via duct 82 fluidly connected to conduit 57 and/or conduit 55. As such, activated carbon or activated coke AC may be added to the waste water WW prior to the waste water WW being fed to the flash vessel 77 and evaporator device 7. The presence of the activated carbon or activated coke AC can result in the adsorption of elements such as insoluble and heavy metal compounds, such as mercury, selenium and arsenic, and can suppress the potential to evaporate such elements when the waste water WW is evaporated in the evaporator device 7. Additionally, the presence of the activated carbon or activated coke AC in the waste water WW can result in the adsorption of elements such as insoluble and heavy metal compounds, e.g., mercury, that may be present in the flue gas FG flowing through the evaporator device 7.

In some embodiments, the activated carbon or activated coke AC can be mixed with the alkaline reagent AR prior to feeding the mixed material from alkaline reagent source 65 via pipe 67 to the waste water conduit 57. In other embodiments, the activated coke or activated carbon AC can be kept separate from the alkaline reagent AR and can be separately added to the waste water WW as illustrated and described above.

The first portion of the flue gas FG from the output conduit 7a of the evaporator device 7 can be merged with the second portion of the flue gas FG output from the preheater 5 in conduit 5a prior to feeding these combined first and second portions of the flue gas FG, i.e., merged flue gas FG, to the particulate collector 9. The particulate collector 9 is fluidly connected via duct 9b to the flash vessel 77, duct 77a, evaporator device 7 and conduit 7a. The particulate collector 9 can be configured as a precipitator such as an electrostatic precipitator, or a filter such as a fabric filter. The particulate collector 9 can alternatively be configured as another type of particulate collector that is configured to separate solid particles and/or particulate matters from the flue gas FG as separated solids. As an option, separated solids separated by the particulate collector 9 may be transported via duct 9b to flash vessel 77, and via duct 77a to evaporator device 7 to enhance evaporation of waste water WW in the evaporator device 7.

The flue gas FG flowing from the particulate collector 9 is split with a first portion of flue gas FG flowing through duct 96 to evaporator device 7, and conduit 7a for flow into conduit 5a. A second portion of flue gas FG flows directly from particulate collector 9 to the wet flue gas desulfurization system 13 via at least one conduit 9a. Conduit 9a fluidly connects the particulate connector 9 to the wet flue gas desulfurization system 13 for the removal of sulfur oxides from the flue gas FG to produce treated flue gas FG prior to the treated flue gas FG flowing via conduit 13a to a stack 15, such as a chimney or a heat recovery steam generator for expelling the treated flue gas FG to the atmosphere. Waste water WW from the wet flue gas desulfurization system 13 is supplied to the heat exchanger 53 via waste water conduit 57.

The separated solids from the particulate collector 9 can include particles produced during the original combustion of fossil fuel F in the combustion unit 1 entrained within the flue gas FG. Additionally, any particulate matter formed from the waste water WW contact with the flue gas FG while cooling and humidifying the flue gas FG, and thereby entrained within the flue gas FG, is separated from the flue gas FG via the particulate collector 9. The separated solids separated by the particulate collector 9 may be transported for storage, treatment or other distribution via at least one solids conduit 11. As another option, separated solids separated by the particulate collector 9 may be transported via duct 9b to flash vessel 77 to enhance evaporation of waste water WW in evaporator device 7.

Disclosed herein is also a method of using system 10 for wet flue gas desulfurization with no waste water WW discharge. The method of using system 10 comprises using a wet flue gas desulfurization system 13 with a flow of absorbent liquid AL, e.g., an alkaline reagent in water, for wet flue gas desulfurization of a flue gas FG flowing therethrough to reduce flue gas acid gas and thereby produce treated flue gas FG, heating and/or evaporating in a heat exchanger 53 with heat and pressure waste water WW supplied thereto from the wet flue gas desulfurization system 13 to produce heated waste water WW and/or steam, depressurizing and flash evaporating the heated waste water WW and/or steam in a flash vessel 77 collecting any remaining waste water WW in flash vessel 77, supplying the collected waste water WW from flash vessel 77 to an evaporator device 7 for evaporation thereof, and releasing the treated flue gas FG from the wet flue gas desulfurization system 13 to the environment.

Embodiments of the system 10 for evaporating waste water WW and for reducing flue gas FG acid gas emissions are configured to avoid capital and operating costs associated with conventional waste water WW treatment, to reduce or eliminate permitting and reporting of waste water WW discharge, to reduce capital and operating costs associated with compliance with air emissions regulations, to improve particulate collection by cooling and humidifying flue gas FG upstream of a particulate collector 9, and to reduce alkaline reagent AR consumption as compared to dry sorbent injection systems. Embodiments of the system 10 as disclosed also avoid corrosion of system 10 equipment through an addition of an alkaline reagent AR such as lime, slaked lime, sodium bicarbonate, or trona, to the waste water WW, as discussed above. Embodiments of system 10 as disclosed also reduce power consumption due to relatively lower flue gas FG pressure drops, as lower flue gas FG pressure drops reduce the need for fan or pump powered movement of the flue gas FG through system 10 and costs associated therewith. Embodiments of system 10 as disclosed also provide for operation of the particulate collector 9 at lower volumes based on decreases in flue gas FG temperature, which can provide still a further operational cost reduction.

It should be appreciated that various changes can be made to embodiments of system 10 for evaporating waste water WW and reducing flue gas FG acid gas emissions to account for different design criteria. For instance, the size, shape or configuration of conduits for transporting different fluids through system 10 can be any of a number of suitable shapes, sizes, or configurations and include any of a number of different vessels, valves, pipes, tubes, tanks, or ducts that have the flow rate of fluid affected by pumps or fans connected to or in fluid communication with the equipment of system 10. The temperatures and/or pressures at which the flue gas FG, waste water WW, and other fluid flows are to be maintained can also be any of a number of suitable ranges to meet a particular set of design objectives. As another example, any type of suitable alkaline reagent AR can be injected within or mixed with the waste water WW to neutralize acid gases absorbed by the waste water WW. Additionally, some embodiments of the system 10 can be configured so that no nitrogen oxide removing unit 3 is necessary.

In summary, the present disclosure is a method for evaporating waste water WW and reducing flue gas FG acid gas emissions comprising supplying waste water WW from a wet flue gas desulfurization system 13 to a heat exchanger 53 for heating and/or evaporation of the waste water WW under pressure to produce heated waste water WW and/or steam, depressurizing and at least partly evaporating the heated waste water WW and/or steam in a flash vessel 77 collecting any remaining waste water WW in flash vessel 77, supplying the collected waste water WW to an evaporator device 7 with a flow of flue gas FG therethrough for evaporation of the waste water WW, and supplying the flue gas FG to the wet flue gas desulfurization system 13 for absorption of acid gas from the flue gas FG to produce treated flue gas FG prior to release of the treated flue gas FG to the environment. The subject method further comprises adding at least one of activated carbon and activated coke AC to the waste water WW prior to heating and evaporation of the waste water WW. The subject method still further comprises supplying an alkaline reagent AR to the wet flue gas desulfurization system 13 for absorption of acid gas from the flue gas FG upon contact with the flue gas FG. Also according to the subject disclosure, heating and/or evaporation of the waste water WW in the heat exchanger 53 is at a temperature of about 175° F. to about 350° F., or about 80° C. to about 180° C. under a pressure of about 1 bar (absolute) to about 10 bar (absolute), or more preferably, about 1.4 bar (absolute) to about 6 bar (absolute). The evaporator device 7 of the subject disclosure is a spray dryer or a vertical reactor dry flue gas desulfurization system with a dispersal element 90 used to disperse a moist absorbent material AM within the vertical reactor.

In summary, the present disclosure is also a system 10 for evaporating waste water WW and reducing acid gas emissions from a combustion flue gas FG, comprising a wet flue gas desulfurization system 13 for absorption of acid gas from the flue gas FG thereby producing waste water WW and treated flue gas FG for release to the environment, a heat exchanger 53 supplied the waste water WW for heating and/or evaporation of the waste water WW to produce heated waste water WW and/or steam, a flash vessel 77 for further evaporation and collection of remaining waste water WW, and an evaporator device 7 upstream of the wet flue gas desulfurization system 13 for evaporation of the remaining waste water WW in a flow of flue gas FG flowing through evaporator device 7. The subject system 10 as disclosed, further comprises a combustion unit 1 producing flue gas FG and fluidly connected to an evaporator device 7 such that at least a first portion of the flue gas FG is supplied to the evaporator device 7. According to the subject disclosure, the evaporator device 7 is a spray dryer or a vertical reactor dry flue gas desulfurization system with a dispersal element 90 used to disperse a moist absorbent material AM within the vertical reactor. Additionally, the subject system 10 further comprises a control device 81 operable for adjustment of system operating conditions and operable to receive measurements from one or more system sensors 50, 52, 54. The subject system 10 still further comprises one or more sensors 50, 52, 54 for intermittent or continuous measurement of system operating conditions of temperature, flow rates and humidity. Further, the heat exchanger 53 of the subject system is operable at a temperature of 175° F. to about 350° F., or about 80° C. to about 180° C. under a pressure of about 1 bar (absolute) to about 10 bar (absolute), or more preferably, about 1.4 bar (absolute) to about 6 bar (absolute) for heating and/or evaporation of the waste water WW supplied thereto to produce heated waste water WW and/or steam.

While the invention has been described with reference to various exemplifying embodiments, it will be understood by those skilled in the art that various changes can be made and equivalents can be substituted for features thereof without departing from the scope of the disclosure. In addition, many modifications can be made to adapt a particular situation or material to the teachings of the disclosure without departing from the essential scope thereof. Therefore, it is intended that the disclosure not be limited to the particular exemplified embodiments disclosed herein as the best mode contemplated, but that the disclosure will include all embodiments falling within the scope of the appended claims.

What is claimed is:

1. A method for evaporating waste water and reducing acid gas emissions in a combustion flue gas, comprising:
   supplying waste water to a heat exchanger for heating of the waste water to produce heated waste water;
   evaporating the heated waste water in a flash vessel and collecting remaining waste water in the flash vessel;
   supplying the remaining waste water to an evaporator device arranged with a flow of the flue gas through the evaporator device for evaporation of the remaining waste water in the evaporator device; and
   supplying the flue gas to a wet flue gas desulfurization system for absorption of acid gas from the flue gas to produce treated flue gas for release to the environment.

2. The method of claim 1, further comprising:
   adding at least one from a group consisting of activated carbon, activated coke, alkaline reagent, and anti-scaling agent, to the waste water prior to heating and evaporation of the waste water.

3. The method of claim 1, further comprising:
   supplying an absorbent liquid to the wet flue gas desulfurization system for absorption of acid gas from the flue gas upon contact with the flue gas.

4. The method of claim 1, wherein heating of the waste water in the heat exchanger is at a temperature of about 175° F. to about 350° F., or about 80° C. to about 180° C.

5. The method of claim 1, wherein heating of the waste water in the heat exchanger is at a pressure of about 1 bar (absolute) to about 10 bar (absolute), or about 1.4 bar (absolute) to about 6 bar (absolute).

6. The method of claim 1, wherein the evaporator device is a spray dryer.

7. The method of claim 1, wherein the evaporator device is a system with moist absorbent material dispersal.

8. A system for evaporating waste water and reducing acid gas emissions from a combustion flue gas, comprising:
   a wet flue gas desulfurization system for absorption of acid gas from the flue gas thereby producing waste water and producing treated flue gas for release to the environment;
   a heat exchanger that is supplied waste water for heating of the supplied with the waste water to produce heated waste water;
   a flash vessel for evaporation of the heated waste water and for collection of remaining waste water in the flash vessel; and
   an evaporation device upstream of the wet flue gas desulfurization system for evaporation of the remaining waste water in a flow of the flue gas flowing through the evaporator device.

9. The system of claim 8, further comprising:
   a combustion unit producing flue gas that is fluidly connected to the evaporator device such that at least a first portion of the flue gas is supplied to the evaporator device.

10. The system of claim 8, wherein the evaporator device is a spray dryer.

11. The system of claim 8, wherein the evaporator device is a system with moist absorbent material dispersal.

12. The system of claim 8, further comprising a control device operable for adjustment of system operating conditions.

13. The system of claim 8, further comprising a control device operable to receive measurements from one or more system sensors.

14. The system of claim 8, further comprising one or more sensors for intermittent or continuous measurement of at least one system operating condition of temperature, flow rate and humidity.

15. The system of claim 8, wherein the heat exchanger is operable at a temperature of about 175° F. to about 350° F., or about 80° C. to about 180° C. and a pressure of about 1 bar (absolute) to about 10 bar (absolute), or about 1.4 bar (absolute) to about 6 bar (absolute) for heating of waste water.

* * * * *